UNITED STATES PATENT OFFICE 2,633,872

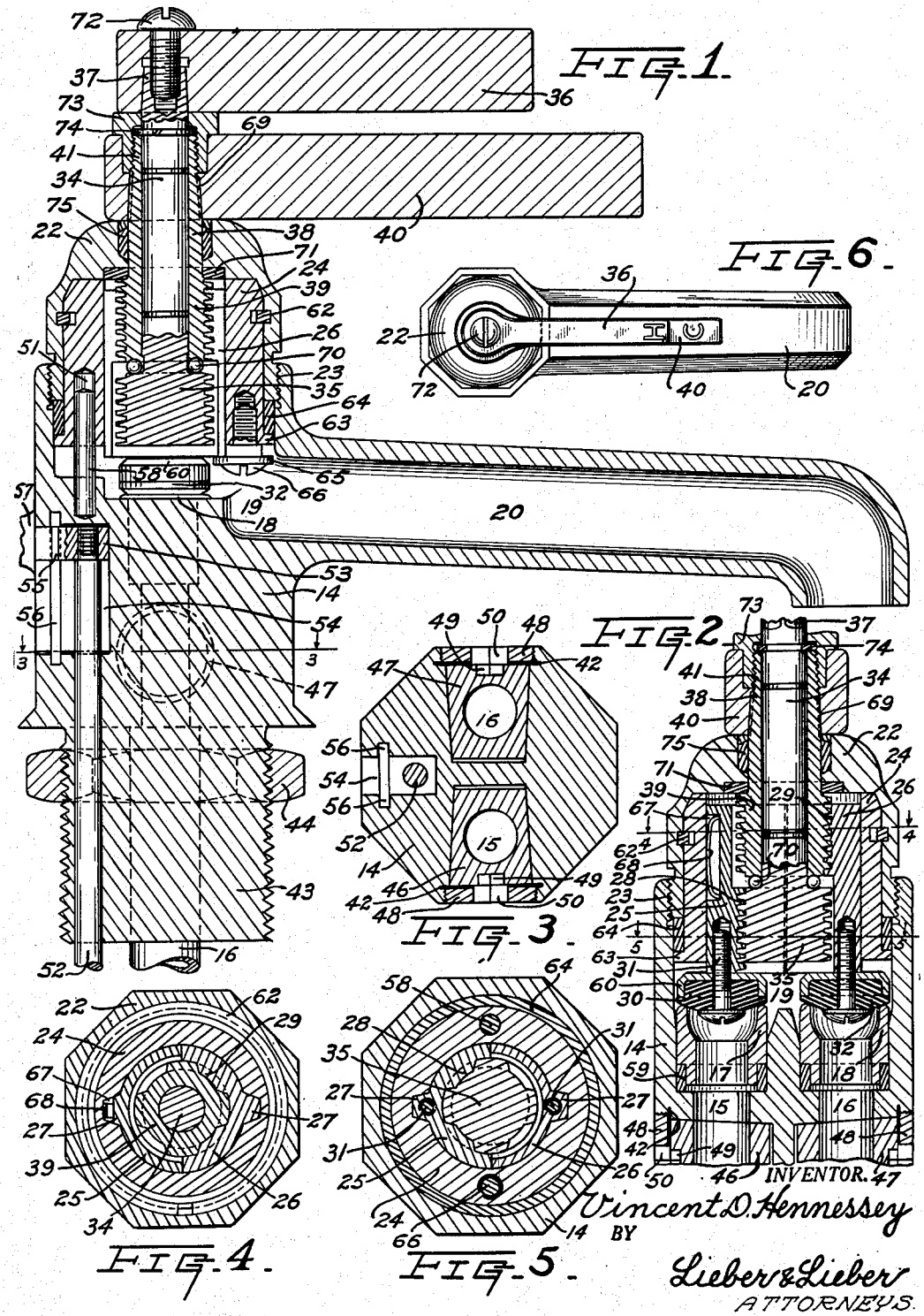

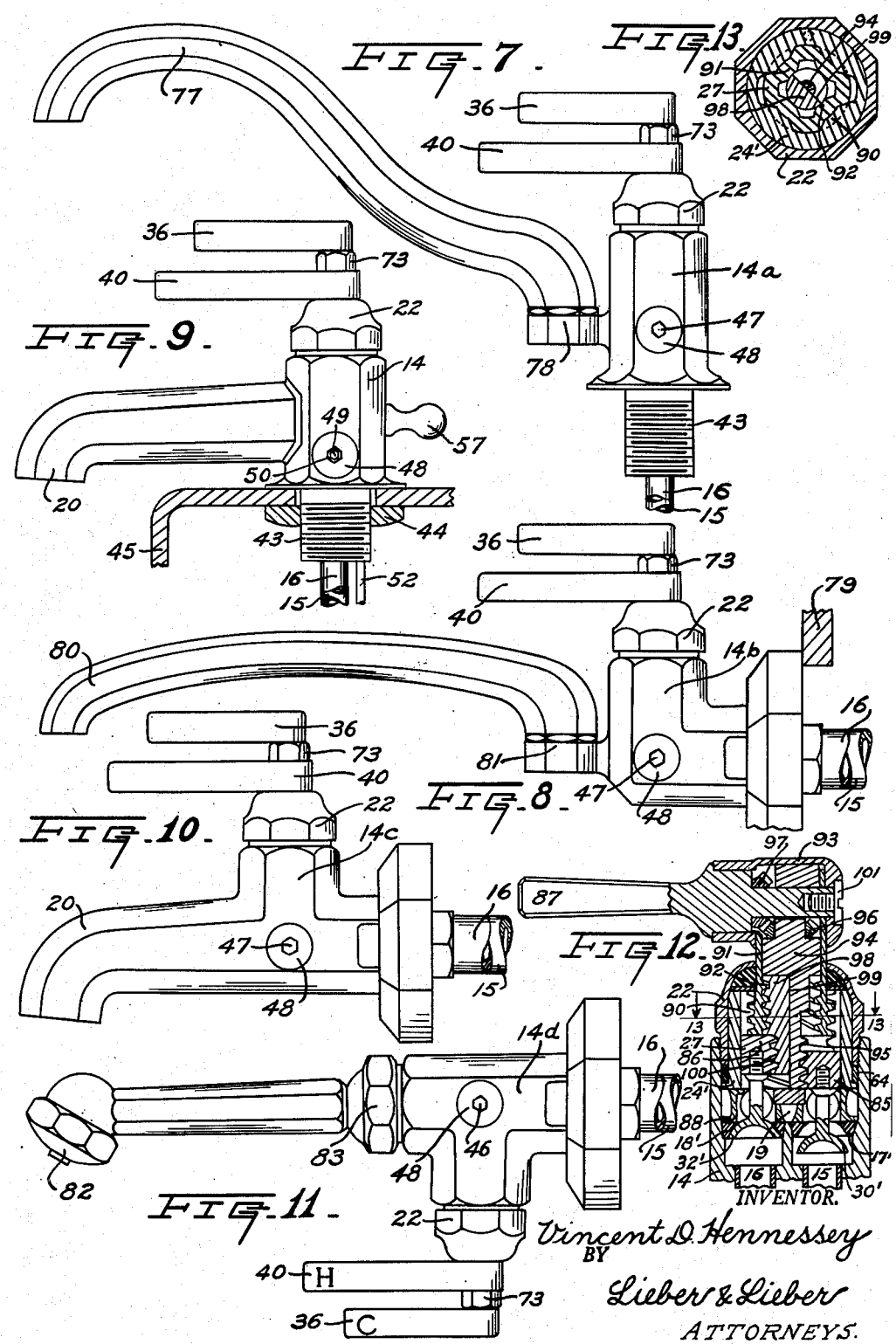

VALVE ACTUATING MECHANISM AND ASSEMBLAGE

Vincent D. Hennessey, Milwaukee, Wis.

Application April 21, 1947, Serial No. 742,801

12 Claims. (Cl. 137—637.3)

The present invention relates generally to improvements in motion converting mechanisms, and relates more specifically to improvements in the construction and operation of a mechanical movement which is especially useful for the purpose of effecting controlled actuation of several elements such as complementary valves of a faucet, or the like.

The primary object of my invention is to provide simple, compact, and highly efficient mechanism for converting the movement of one or more actuators into definite motion of one or several independent elements.

Numerous types of so-called mixing valves for producing variable mixtures of hot and cold water, have heretofore been proposed and used in the plumbing industry with varying degrees of success. Most of these prior mixing valves besides being costly and relatively unreliable in operation, are complicated and cumbersome, and require considerable attention in order to maintain proper functioning thereof. While some of the previous mixers are capable of being manipulated by means of a single handle, most of these prior devices can be actuated only to vary the ratio of the constituents while maintaining a constant discharge volume, and few of them can be dependably operated to produce any desired definite mixture at varying volume. It is also difficult to re-seat the valves of many of the prior mixers; and the valves of these previous devices are in most cases difficult to insert and remove, and may be seriously damaged by the application of excessive force to the manipulating handles.

It is therefore a more specific object of my present invention to provide an improved fluid mixing valve assemblage which obviates substantially all of the objectionable features of prior devices of this general class, and which is adapted to be applied to dispensing valves and faucets of various types for diverse purposes.

Another important object of this invention is to provide an improved mechanical movement which is adapted to effectively convert the movement of an actuating member into selective motion of several independent elements, such as valves.

A further specific object of the invention is to provide an improved actuating mechanism for hot and cold water mixing valves or the like, which is readily operable to produce any predetermined ratio of the ingredients in the mixture for any selected total discharge volume.

Still another object of my invention is to provide an extremely compact and durable valve actuating structure which may be conveniently installed in faucets of limited size for various purposes, and which is manipulable to deliver varying volumes of either hot, cold, or a mixture of hot and cold liquid through a common discharge spout or orifice.

Another specific object of the present invention is to provide a simple mechanical movement occupying limited space, and which is operable to convert movement of actuating means into predetermined motion of several elements movable relative to the actuator.

A further specific object of this invention is to provide a leak-proof mixing valve all parts of which are readily accessible for inspection, and which may be conveniently assembled, adjusted or dismantled with the aid of simple and normally available tools, such as a wrench, screw driver, etc.

An additional specific object of the invention is to provide an improved faucet unit for delivering liquid from several sources to a common discharge spout, wherein either or both sources of supply may be cut-off or regulated independently of the other without affecting the actual valve actuating mechanism, and which may be utilized in various types of plumbing fixtures.

Another object of this invention is to provide a single, compact, low cost and conveniently installed and operable unit capable of performing various desired functions heretofore requiring the use of several distinct units.

A further object of the invention is to provide an improved faucet assemblage wherein the valves may be readily reseated and re-adjusted to their respective seats from the exterior without any disassembling of parts, independently of their normal actuation.

Still another specific object of this invention is to provide improved means for decreasing wear on the valves of a faucet or the like, by limiting the movement of the valves toward their respective seats, and also by causing said valves to approach their seats with translatory motion only and without any rotation, twisting or cutting action between the valves and their seats.

A further specific object of the invention is to provide an improved valve assemblage having a casing or body, and valve actuating mechanism interchangeably and effectively cooperable with valves adapted to close either with or against the fluid supply pressure.

Still another object of my invention is to provide an improved fluid mixing device which may be manufactured in various sizes and for diverse purposes at moderate cost, which is exceedingly flexible in its adaptations and easily manipulable to accurately produce various predetermined results, and wherein transmission of rotative force from one actuator to another is prevented.

These and other objects and advantages of the invention will be apparent from the following detailed description.

A clear conception of my improved mechanical movement and other features, and of the practical embodiment thereof in several types of typical faucets, may be had by referring to the drawings accompanying and forming a part of this specification in which like reference characters designate the same or similar parts in the various views.

Fig. 1 is a central longitudinal section through one of the improved mechanical movements embodied in a faucet having poppet type hot and cold water control valves therein, showing operating mechanism and valves in closed position;

Fig. 2 is another central longitudinal section through a fragment of the same faucet assemblage, the section however having been taken at right angles to that of Fig. 1, and showing the parts in the same position;

Fig. 3 is a transverse section through the assemblage of Figs. 1 and 2, taken along the line 3—3 of Fig. 1;

Fig. 4 is another transverse section through the same faucet assemblage, taken along the line 4—4 of Fig. 2;

Fig. 5 is still another transverse section through the faucet assemblage, taken along the line 5—5 of Fig. 2;

Fig. 6 is a top view of the faucet spout and manipulating levers or handles, showing one mode of identification of the latter;

Fig. 7 is a side elevation of a goose-neck type swing-spout faucet mountable upon a horizontal support, and embodying the invention;

Fig. 8 is a similar side elevation of a horizontal type swing spout faucet mountable upon an upright support, and likewise embodying my invention;

Fig. 9 is a side elevation of a fixed spout faucet such as shown in Figs. 1 to 6 inclusive, and adapted to be mounted upon a horizontal support;

Fig. 10 is a similar side elevation of a fixed spout faucet mountable upon an upright support;

Fig. 11 is another side elevation of an adjustable spray head fixture mountable upon an upright support, and also embodying the present invention;

Fig. 12 is a central vertical section similar to Fig. 2, through a modified mixing valve assemblage embodying pressure seated valves, and a single actuating handle common to both valves; and Fig. 13 is a transverse section through the modified assemblage of Fig. 12, taken along the line 13—13 of Fig. 12.

Although the improved mechanical movement comprising the gist of my invention has been shown and described herein as being especially adapted for advantageous application to various types of water mixing fixtures in the plumbing industry, it is not my desire or intention to thereby unnecessarily restrict the utility of the new mechanism, and the improvements may obviously be applied to valve assemblages of various types and for various purposes other than those specifically illustrated and described.

Referring to the drawings, the typical mixing valve assemblage shown therein, comprises in general a main base or faucet casing 14 having hot and cold water supply conduits or pipes 15, 16 respectively commmunicable past renewable valve seats 17, 18 with a common mixing chamber 19 which is in open communication with a single discharge spout 20 formed integral with the casing 14; an auxiliary casing or cap 22 having external screw threads 23 cooperable with internal threads of the casing 14 and having therein an annular bushing or liner 24 cooperating with the cap to form a closure for the mixing chamber 19; a pair of semi-circular slides 25, 26 each having an external integral longitudinal rib 27 slidable within internal longitudinal grooves formed in the liner 24, the slide 25 having internal semi-circular screw threads 28 near one end thereof and the other slide 26 having similar internal screw threads 29 thereon near its opposite end; a hot water control valve 30 secured to the slide 25 by a screw 31 and coacting with the valve seat 17; a cold water control valve 32 secured to the other slide 26 by a screw 31 and coacting with the valve seat 18; an inner solid hot water valve actuating stem 34 having one enlarged end 35 provided with peripheral screw threads coacting with the inner threads 28 of the slide 25 only, and also having an actuating lever or handle 36 detachably secured to its opposite end 37; and an outer hollow cold water valve actuating stem 38 snugly embracing the inner stem 34 and having an enlarged end 39 provided with peripheral screw threads coacting with the inner threads 29 of the slide 26 only, and also having an actuating lever or handle 40 detachably secured to its opposite end 41 at taper 69.

The main base or faucet casing 14 may be formed of any suitable material and the end thereof remote from the closure cap 22, may be provided with an externally screw threaded projection 43 and with a clamping nut 44 for affecting attachment of the faucet assemblage to a support 45, as shown in Figs. 1 and 9. The water supply pipes 15, 16 may be attached to the free end of the projection 43; and the base portion of the casing 14 between the projection 43 and the valve seats 17, 18, may be provided with two segregated tapered sockets having internal threads near their outer ends within which tapered rotary shut-off valves or plugs 46, 47 are confined and frictionally retained by means of fixed washers 42 secured to the casing 14, and by means of peripherally threaded rotatable retainer disks 48, as illustrated in Figs. 2 and 3. Each of these plug valves 46, 47 has a polygonal socket 49 at its outer end for effecting turning thereof with the aid of a tool having a correspondingly polygonal end, and each of the retainer disks 48 is provided with a larger polygonal central opening 50 located in axial alinement with the adjacent socket 49 for effecting adjustment of the tapered plugs 46, 47 relative to the sockets in the casing 14, and for facilitating insertion or removal of the disk 48 with the aid of a similar tool. The shut-off plug 46 is obviously adapted to either cut-off or to merely throttle the supply of warm or hot water delivered from the pipe 15, and the other shut-off valve 47 is likewise adapted to either cut-off or to merely throttle the supply of cool or cold water delivered from the pipe 16, but it is to be noted that these shut-off or throttle valves 46, 47 are operable independently of each other.

If so desired, the main casing 14 may also be provided with a drain or waste control as shown in Figs. 1, 3 and 9, and this control consists primarily of: a rod 52 threaded at one end and slidably cooperating with a bore formed in the base 14 and its projection 43; a guide block 53 threaded to receive the threaded end of the rod 52 and slidably movable within a recess 54 formed in the side of the casing 14 and having lateral projections 55 slidably engaging grooves 56 extending laterally away from the recess 54; and a manipulating knob or handle 57 secured to the block 53. The casing 14 is moreover provided with a locating pin 58 extending through the mixing chamber 19 toward and slidably engaging a bore 51 formed in the liner 24 to definitely locate and to positively prevent rotation of the latter; and the valve seats 17, 18 may be screw threaded for convenient insertion and removal within the base 14, and coact with annular seals 59 as illustrated in Fig. 2. The valves 30, 32 may be formed of any suitable material, and may be provided with protecting caps 60, and as previously indicated, these valves are firmly attached to the slides 25, 26 respectively, by the screws 31.

The auxiliary casing or closure cap 22 may also be formed of any suitable material, and is bored to snugly fit but to rotatably engage the annular non-rotatable liner bushing 24. A resilient snap ring 62 which coacts with adjoining grooves formed in the cap 22 and liner 24 as indicated in Figs. 1, 2 and 4, serves to unite these parts while permitting rotation of the cap 22 about the liner, and the bore 51 of the bushing 24 is adapted to slidably engage the fixed pin 58, so that when the closure cap 22 is rotated and screwed into the main casing 14 the bushing 24 will slide along the guide pin 58 but will be held against rotation about the central faucet axis, thus definitely positioning the valve actuating mechanisms and the valves 30, 32 relative to the valve seats 17, 18. The liner bushing 24 is also provided with an integral end flange 63 and an annular packing 64 is interposed between the casing 14, cap 22 and the flange 63, whereby the adjacent screw thread joint is effectively sealed when united; and a stop 65 which may be secured to the flanged end of the liner 24 between the valves 30, 32 by an integral screw 66, is adapted to coact with the adjacent ends of both valve actuating slides 25, 26 in order to positively but independently limit the closing pressure which can be applied to the valves and seats. As previously described, each of the semi-circular slides 25, 26 is provided with an integral rib 27 and the bushing 24 is provided with parallel grooves with which the ribs 27 are slidingly engageable, and in order to prevent looseness of parts and undesirable rotation of one stem when the other is rotated, one or both of the ribs 27 may be provided with a cut-out 67 such as shown in Figs. 2 and 4, in which a leaf spring 68 coacting with liner 24 may be confined.

The hot water control valve 30 is firmly but detachably secured to the inner end of the slide 25 and the cold water control valve 32 is likewise secured to the inner end of the other slide 26, by the screws 31; and the semi-circular internal threads 28 of the slide 25 coact only with the peripherally threaded solid end head 35 of the inner solid actuating stem 34 while the semi-circular internal threads 29 of the other slide 26 coact only with the likewise peripherally threaded hollow end head 39 of the outer hollow actuating stem 38. An annular anti-friction or ball bearing 70 is interposed between the stem heads 35, 39 in order to reduce the friction and wear to a minimum, and the inner solid stem 34 snugly engages and is rotatable within the central bore of the hollow stem 38, while the latter snugly but rotatably engages a central bore in the cap 22 and carries a bearing ring 71 coacting with the cap. The two stems 34, 38 are rotatable independently of each other, and the ball bearing 70 and the leaf spring 68 function to permit such independent rotation of the stems without transmitting the rotating force of one stem to the other. The hot water valve actuating handle 36 is firmly but removably secured to the outer tapered end 37 of the stem 34 by means of a screw 72, and the cold water valve actuating handle 40 is preferably made slightly longer than the handle 36 and is also firmly but removably attached to the tapered end 69 of the stem 38 by means of a clamping ring nut 73. A sealing snap ring 74 may be sprung into a groove in the shaft 34 at the adjacent end of the hollow stem 38 in order to prevent longitudinal movement of the stem 38 along the stem 34, and an annular packing gland 75 may also be provided in the closure cap 22 around the protruding end of the hollow stem 38 near the handle 40 so as to eliminate possible leakage at this zone. Annular sealing and lubricating grooves may also be provided along the stem 34 at selected localities, as shown.

After the improved mixing faucet has been properly constructed and assembled as above described, either one or both of the control valves 30, 32 may be independently or simultaneously actuated at will in the following manner. Assuming both shut-off valve plugs 46, 47 to have been adjusted to partial or fully open position, when the lever handle 36 alone is swung from closed position to one side, the correspondingly swinging or rotating inner stem 34 and its integral screw threaded end head 35 coact with the internal threads 28 of the semi-circular slide 25 to lift or move the valve 30 away from its seat 17, more or less depending upon the extent to which the handle 36 is swung. When on the other hand, the lever handle 40 alone is swung to one side from closed position, the correspondingly swinging or rotating outer stem 38 and its integral screw threaded end head 39 coact with the internal threads 29 of the semi-circular slide 26 to lift or move the valve 32 away from its seat 18, more or less also depending upon the extent to which the handle 40 is swung. In this manner, the hot and cold water control valves 30, 32 may be opened or closed independently of each other so as to deliver either hot or cold water alone from the supply pipes 15, 16 respectively to the faucet spout 20.

By swinging both handles 36, 40 simultaneously, both valves 30, 32 may be opened to admit both hot and cold liquid to the mixing chamber 19 from which the resultant mixture will be delivered to and through the spout 20. The ratio of the ingredients, namely hot and cold liquid, contained in the mixture thus produced, and hence the temperature thereof, may obviously be varied to suit, by merely swinging the handles 36, 40 through different angles; and such variation in ratio may readily be effected without necessarily increasing or diminishing the volume of the mixture by properly manipulating the actuating handles. The rate of admission of water past the valves to the mixing chamber as well as the pressure thereof, may also be independently varied by adjusting the plug valves 46, 47, and the supply of either hot or cold liquid or both, may be quickly cut-off entirely by closing the corresponding valve plugs 46, 47. In this manner, my improved mixing valve assemblage may be manipulated by a novice to meet varying conditions of operation, with minimum effort on the part of the operator, and the improved motion transmitting mechanism comprising the slides 25, 26 and the screw threaded stem heads 35, 39 coacting therewith, provides a compact and durable instrumentality for positively imparting movement of the actuating handles 36, 40 to the valves either independently or simultaneously.

The improved valve actuating unit may obviously be installed in relatively small casings 14 of diverse shapes, and while the mechanism as specifically described is associated with an ordinary sink or tub faucet having a horizontal support 45 therebeneath, as shown in Fig. 9, this same mechanism is adapted for similar installation in many other types of fixtures some of which are shown in elevation in Figs. 7, 8, 10 and 11. In Fig. 7 the improved mechanical movement and shut-off valves, have been embodied in a gooseneck type swing-spout faucet adapted to be mounted upon a horizontal support as in Fig. 9. The modified base or casing 14a of this embodiment has a goose-neck spout 77 swingable about a hollow pivot 78 carried by the casing 14a, to deliver either hot or cold liquid alone, or any desired mixture thereof from the spout 77 upon proper manipulation of the plug valves 46, 47 and of the handles 36, 40. In Fig. 8 the same mechanical movement and shut-off valves, have been embodied in a horizontal type swing-spout faucet adapted for coaction with an upright support 79, and the modified base or casing 14b of this embodiment has a slightly curved horizontal spout 80 swingable about a hollow pivot 81 carried by the casing 14b, to deliver either hot or cold liquid alone, or a mixture thereof, from the spout 80 upon proper manipulation of the valves 46, 47 and of the handles 36, 40.

Fig. 10 illustrates a fixed spout faucet similar to that of Fig. 9, but adapted for coaction with an upright support as in Fig. 8, and the modified base or main casing 14c of this faucet has a fixed spout 20 likewise adapted to deliver either hot or cold water alone, or a predetermined mixture thereof, from the spout 20 upon proper manipulation of the valves 46, 47 and of the handles 36, 40. As shown in Fig. 11, the invention is also applicable to a universally adjustable spray head fixture coacting with an upright support as in Fig. 8, and the modified base or casing 14d of this fixture has the actuating mechanism inverted, and is provided with a spray head 82 mounted for universal adjustment upon the casing 14d by means of a hollow universal joint 83. This fixture is also adapted by proper manipulation, to deliver either hot or cold water alone, or a mixture thereof, through the spray head 82, and the invention may obviously be just as readily applied to various other types of fixtures. It is also to be noted that the improved waste control which is operable by vertical shifting of the handle 57, may be readily applied to the faucets of Figs. 7 and 9, as well as others.

While the valve assemblages of Figs. 1 to 11 inclusive are all of a type wherein the valves 30, 32 are opened with the supply line pressure and are closed or seated against this pressure, and in which the two valves are manipulable by means of independent coaxial actuating stems each provided with a separate handle, it is also possible to utilize the improved mechanism of Figs. 1 to 5 inclusive for the purpose of operating valves 30', 32' adapted to open against the supply line pressure and to close with such pressure, and it is moreover possible to manipulate all of the valves with the aid of a single or common actuator or handle 87, as illustrated in Figs. 12 and 13. The modified valve assemblage shown in Figs. 12 and 13 comprises a main casing 14 having fluid supply lines 15, 16 communicable past renewable valve seats 17', 18' respectively with a common mixing chamber 19 communicating with a discharge spout; an auxiliary casing or cap 22 adjustably and detachably secured to the main casing 14 and having therein a nonrotary but vertically adjustable liner 24' cooperable with the cap to enclose the chamber 19; a pair of pressure closed valves 30', 32' cooperable with the seats 17', 18' respectively; a pair of vertically reciprocable slides 85, 86 to which the respective valves 30', 32' are secured, these slides having longitudinal ribs 27 coacting with guide grooves in the liner 24' and being provided with inner parallel teeth or ridges facing the central axis of the casings 14, 22; and actuating means for the slides 85, 86 cooperable with these ridges and operable by means of a single or common handle 87 to either simultaneously or to independently open and close the valves 30', 32'.

As clearly indicated, each of the valves 30', 32' is adapted to open against the supply line pressure and to close with this pressure, and the annular valve seats 17', 18' are removably confined within the casing 14 by a cage 88 and by the liner 24' coacting with this cage. These valves 30', 32' and the seats 17', 18' are adapted to be substituted for the corresponding parts used in Figs. 1 to 5 inclusive, and are also adapted to cooperate with the slides 25, 26 and with the stems 34, 38 and handles 36, 40 in the same manner as hereinabove described. The casing 14 having holes provided with upper tapers merging into lower cylindrical portions, is therefore adapted to interchangeably receive either type of valve seats 17, 18, 17', 18', and the shut-off valves 46, 47 and waste control may also be applied to this casing, thereby vastly increasing the utility of the invention.

The improved slide and valve actuating means of this modified assemblage is so constructed that it permits the use of a single handle 87 to either open or close either valve 30', 32' alone, or to simultaneously open or close both of these valves. The slides 85, 86 are semi-circular and both have external guide ribs 27 coacting with longitudinal internal grooves formed in the liner 24', and the interior of this liner is also provided with screw threads 90. A hollow stem 91 is journalled for rotation in the cap 22 and has external screw threads at its lower end coacting with the liner threads 90, while its lower interior is provided with internal screw threads 92. The upper end of the hollow stem 91 has a journal housing 93 for the handle 87 attached thereto, so that the handle 87 may either be oscillated about the stem axis to rotate the stem 91, or this handle may be rotated about its own axis without rotating the hollow stem, or it may be both oscillated and rotated.

An inner stem element 94 is journalled for rotation by the handle 87 within the hollow stem 91, and has external semi-circular screw threads 95 at its lower end coacting with similar internal screw threads on the semi-circular slide 85; and the upper end of the element 94 is provided with a bevel gear 96 which meshes with another bevel gear 97 secured to the handle 87, so that rotation of this handle about its own axis will rotate the stem element 94 and will move the slide 85 and the valve 30' either up or down depending upon the direction of said rotation. Another valve actuating element 98 confined within the hollow stem 91 has sliding coaction with the lower portion of the element 94 along a flat surface 99, and is provided at its upper portion with external semi-circular screw threads coacting with the internal threads 92 of the stem 91, and at its lower portion with external parallel semi-circular teeth 100 lying in planes perpendicular to the central stem axis and coacting with similar internal teeth on the slide 86. Rotation of the stem 91 by oscillation of the handle 87 about the stem axis, will cause the stem to move vertically and will also cause the coacting element 98 to thereby move the slide 86 and the valve 32' either up or down depending upon the direction of said rotation, while the slide 85 and the valve 30' remain stationary. The handle 87 may be detachably secured to the housing 93 by a screw 101 and passes through an opening in the upper extremity of the hollow stem 91 so that this stem will be positively rotated when the handle is oscillated, but the inner stem element 94 is freely rotatable relative to the handle and is fixed against axial displacement by the handle 87 and by the upper end of the internal thread 92.

During normal use of the modified valve assemblage and when valve 32' has been opened, mere rotation of the handle 87 about its own axis will not rotate the stem 91, but will rotate the gears 96, 97 thus causing the teeth of the rotating inner stem element 94 to move the slide 85 and the valve 30' up or down; and as shown in Fig. 12 such rotation of the handle 87 has been effected so as to open the hot water supply valve 30'. During such operation the element 98 has also been rotated and by virtue of its coaction with the threads 92 of the stem 91, this element 98 has moved upwardly and its teeth 100 coacting with the slide 86 has seated or closed the valve 32'. If the handle 87 be merely oscillated or swung about the axis of the stem 91 so as to rotate this stem, both of the elements 94, 98 will be simultaneously rotated therewith, and the fixed liner threads 90 will coact with the external stem threads to move the rotating stem 91 and the element 94 axially, while the internal threads 92 of the stem 91 will simultaneously coact with the element 98 to move this element axially along with the stem, thereby, through coaction of the teeth 100 with the slide 86, opening or closing the valve 32', depending upon the direction of swinging of the handle 87. During such operation, the valve 30' will remain closed or seated since the inclination of the threads 95 will permit free rotation of the stem 91 and element 94 without disturbing the slide 85 and valve 30'. However, when the handle 87 is both rotated about its own axis, and oscillated about the stem axis, both valves 30', 32' may be opened or closed to any desired extent depending upon the extent of each movement of the operating handle, thus providing a common or single operating member for effecting variable opening or closing of both valves, and independent opening or closing of either valve.

From the foregoing detailed description, it will be apparent that my present invention provides an improved motion transmitting mechanism especially adapted for the purpose of actuating one or more reciprocable elements, such as the valves of plumbing fixtures, and which is extremely compact and durable in construction and highly efficient in use. The improved motion converting and transmitting structure is also flexible in its adaptations and conveniently manipulable to actuate the elements either independently or simultaneously. The flexibility of the motion transmitting mechanism and its adaptations, may be augmented by utilizing shut-off valves in conjunction therewith, and when embodied in an improved faucet or plumbing fixture assemblage such as shown, the mechanism is well protected and the structure effectively sealed against leakage. All parts of the improved assemblage are readily accessible for either normal manipulation, adjustment of parts, or inspection, and the unit may be conveniently assembled, dismantled and installed. The improved construction of the semi-cylindrical or circular slides and of the actuating means coacting therewith, insures long life with minimum wear because of the extensive area afforded by the screw threads of these elements, and the antifriction bearing 70 disposed between the stems 34, 38 also eliminates excessive friction and resultant wear.

By providing the main casing with shut-off valves and a waste control, in addition to the valve actuating mechanism, a compact and efficient faucet unit adapted for diverse purposes is produced, and the plumbing installation is greatly simplified. In each of the assemblages shown, the casing liner 24 is fixed against rotation by a locating pin secured to the main casing body 14, but this liner and the associated parts, are movable toward the valve seats by rotation of the cap 22 which is manipulable from the exterior of the unit, thus providing simple means for causing the valves to properly cooperate with their seats. The valves themselves have motion of translation only relative to their seats and do not rotate about their axes, thereby eliminating abrasion and cutting action; and valves adapted to close either with or against the pressure may obviously be utilized in the same casing and liner assemblage. The leaf spring 68 cooperates with the ball bearing 70 to insure most efficient functioning of the various parts, and although all of the slides of both types of mechanism shown and described, have been provided with parallel guiding ribs 27, it is to be noted that only one slide of each complementary set need be provided with such guiding means, since the slides of each set have mutual coaction. While the dual operating handles of Figs. 1 to 5 is somewhat less complicated, a common operating handle such as shown in Fig. 12 may be utilized to actuate both valves; and both embodiments of the invention have been constructed and successfully operated, and may be manufactured in quantity at moderate cost.

It should be understood that it is not desired to limit this invention to the exact details of construction and operation, herein shown and described, for various modifications within the scope of the appended claims may occur to persons skilled in the art; and it is also contemplated that specific descriptive terms employed herein, be given the broadest possible interpretation consistent with the disclosure.

I claim:

1. A valve assemblage comprising, a casing having several fluid inlets communicable with a mixing chamber, a closure cap for said chamber rotatably and adjustably attachable to said casing, an annular liner snugly fitting said cap and being movable by rotation of said cap toward and away from said chamber, means associated with said casing for preventing rotation of said liner, a valve cooperable with each of said inlets to control the delivery of fluid to said chamber, a slide for opening and closing each of said valves independently of the other, all of said slides being guided for sliding movement relative to said liner and each having teeth directed toward the central liner axis located between the slides, and coaxial independently manipulable actuating means rotatable about said axis and being fixed against longitudinal movement, each of said actuating means having threads cooperable with the teeth of only one of said slides.

2. A valve assemblage comprising, a casing having several fluid inlets communicable with a mixing chamber, a closure cap for said chamber rotatably attachable to said casing, an annular liner fixed against rotation by said casing and being axially movable for adjustment toward and away from said chamber by manipulation of said cap, a valve cooperable with each of said inlets, a slide for opening and closing each of said valves independently of the others, said slides being guided for reciprocation within said liner and each having teeth facing the central intervening liner axis, and coaxial rotary actuating means for said slides each having a thread coacting with the teeth of only one of said slides.

3. A valve assemblage comprising, a casing having several fluid inlets, a flow regulating valve cooperable with each of said inlets, independent slides for opening and closing said valves, said slides being guided for reciprocation within said casing and each having teeth facing an axis located between the slides, coaxial independently manipulable actuating stems for said slides each having a screw thread coacting with the teeth of only one of said slides, and a spring interposed between at least one of said slides and said casing for resiliently urging said slide toward said axis.

4. A valve assemblage comprising, a casing having several fluid inlets, a flow regulating valve for each of said inlets, a closure cap for confining said valves within said casing, said cap being rotatably adjustable relative to said casing, a liner for said cap, a locating pin secured to said casing and slidably engaging said liner to prevent rotation of the latter while permitting movement thereof toward and away from the casing during rotation of the cap, slides guided for movement in said liner, each of said slides being secured to one of said valves and having teeth projecting toward an axis located between the slides, and actuating means rotatable about said axis and each having a screw thread cooperating with the teeth of only one of said slides to effect independent actuation of said valves.

5. A valve assemblage comprising, a casing having a pair of fluid inlets and a common fluid outlet, a fluid pressure opened valve cooperable with each of said inlets, a slide for moving each of said valves toward its inlet and away from said outlet to close the valves, said slides being guided for longitudinal reciprocation along an intervening axis relative to said casing and each having semi-circular teeth facing an opposite side of said axis, coaxial actuating stems independently rotatable about said axis and having helical screw threads cooperable with the teeth of said slides to reciprocate the latter, and a leaf spring interposed between at least one of said slides and said casing for constantly urging said slide toward said axis.

6. A valve assemblage comprising, a unitary casing having a pair of fluid inlets and a common fluid outlet, an independently manually operable shut-off valve mounted directly in said casing in each of said inlets, a fluid pressure closed valve cooperable with each inlet closely adjacent to and beyond the shut-off valve therein, a slide for moving each of said valves away from its inlet and toward said outlet to close the valve, said slides being guided for longitudinal reciprocation along an intervening axis relative to said casing and each having semi-circular teeth facing an opposite side of said axis, and coaxial actuating stems independently rotatable about said axis and having helical screw threads cooperable with the teeth of said slides to reciprocate the latter.

7. A valve assemblage comprising, a casing having a pair of fluid inlets, a valve for controlling the flow of fluid through each inlet, a slide for moving each valve, each slide being operatively connected to one of said valves and having teeth facing and disposed on opposite sides of an axis located between the valves, a liner adjustable along said axis but fixed against rotation relative to said casing and having means for guiding said slides, and coaxial stems rotatable about said axis and having helical screw threads cooperable with said teeth to move said valves.

8. A valve assemblage comprising, a casing having a pair of laterally spaced fluid inlets, a valve for controlling the flow of fluid through each inlet, a reciprocable slide for opening and closing each valve, each slide being operatively connected to one of said valves and having semi-circular teeth facing and disposed on opposite sides of an axis located between the valves, a liner adjustable along but fixed against rotation relative to said casing and said axis and having grooves for guiding said slides, and coaxial stems independently rotatable about said axis and having helical external screw threads of like diameter cooperable with said teeth to open and close said valves.

9. A valve assemblage comprising, a casing having a pair of fluid inlets, a valve for controlling the flow of fluid through each inlet, a slide for moving each valve, each slide being operatively connected to one of said valves and having teeth facing and disposed on opposite sides of an axis located between the valves, a liner adjustable along but fixed against rotation relative to said axis and having means for guiding said slides, coaxial stems rotatable about said axis and having helical screw threads cooperable with said teeth to move said valves, and a cap rotatable about said liner and adjustably cooperating with said casing to move the liner along said axis whenever the cap is rotated.

10. A valve assemblage comprising, a casing having a pair of laterally spaced fluid inlets, a valve for controlling the flow of fluid through each inlet, a reciprocable slide for opening and closing each valve, each slide being operatively connected to one of said valves and having semi-circular teeth facing and disposed on opposite sides of an axis located between the valves, a liner adjustable along but fixed against rotation relative to said casing and said axis and having grooves for guiding said slides, coaxial stems independently rotatable about said axis and having helical external screw threads of like diameter cooperable with said teeth to open and close said valves, and a closure cap rotatably embracing and secured to said liner and having screw thread coaction with said casing so that rotation of the cap will adjust the line longitudinally of said axis.

11. A valve assemblage comprising, a casing having several fluid inlets and a single fluid outlet, a valve for controlling the flow of fluid through each of said inlets, a slide for moving each of said valves relative to its inlet, each of said slides being guided for longitudinal reciprocation along the central axis of said casing and having thereon semi-circular screw threads facing said axis and terminating in a common plane of sliding engagement between the slides, and coaxial actuating stems independently rotatable about said axis and each having thereon helical screw threads cooperable with the semi-circular threads of one of said slides to reciprocate the same.

12. A valve assemblage comprising, a casing having a pair of fluid inlets on opposite sides of its central axis and also having a single fluid outlet, a valve on each of the opposite sides of said axis for controlling the flow of fluid through one of said inlets, a slide for moving each of said valves relative to its inlet, each of said slides being guided by said casing for movement along said axis and having thereon semi-circular screw threads facing and terminating in a common diametrical plane of the axis along which the slides are directly engageable, and coaxial actuating stems independently rotatable about said axis and each having thereon helical screw threads cooperable with the semi-circular threads of one of said slides to reciprocate the same when the stem is rotated.

VINCENT D. HENNESSEY.

REFERENCES CITED

The following references are of record in the file of this patent:

UNITED STATES PATENTS

| Number | Name | Date |
| --- | --- | --- |
| 400,177 | Bell | Mar. 26, 1889 |
| 927,438 | Thomas | July 6, 1909 |
| 1,734,791 | Bicknell | Nov. 5, 1929 |
| 1,960,278 | Niedecken | May 29, 1934 |
| 2,149,367 | Sedlon | Mar. 7, 1939 |
| 2,238,916 | Powers | Apr. 22, 1941 |

FOREIGN PATENTS

| Number | Country | Date |
| --- | --- | --- |
| 539,659 | Great Britain | of 1941 |